Jan. 26, 1937. L. R. ADAMS 2,069,054
WARNING DEVICE
Filed Oct. 15, 1935
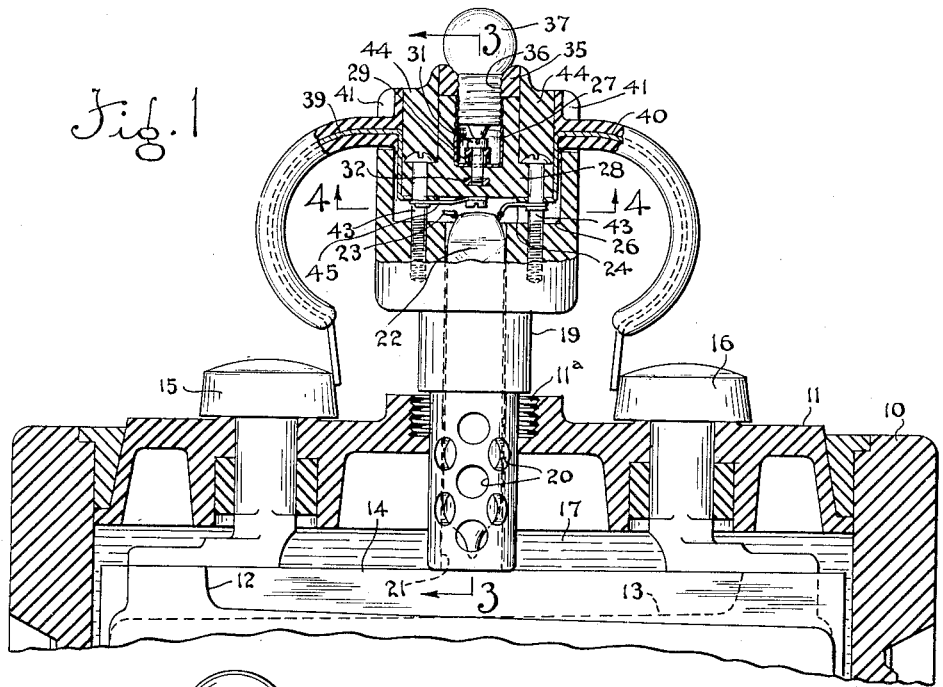
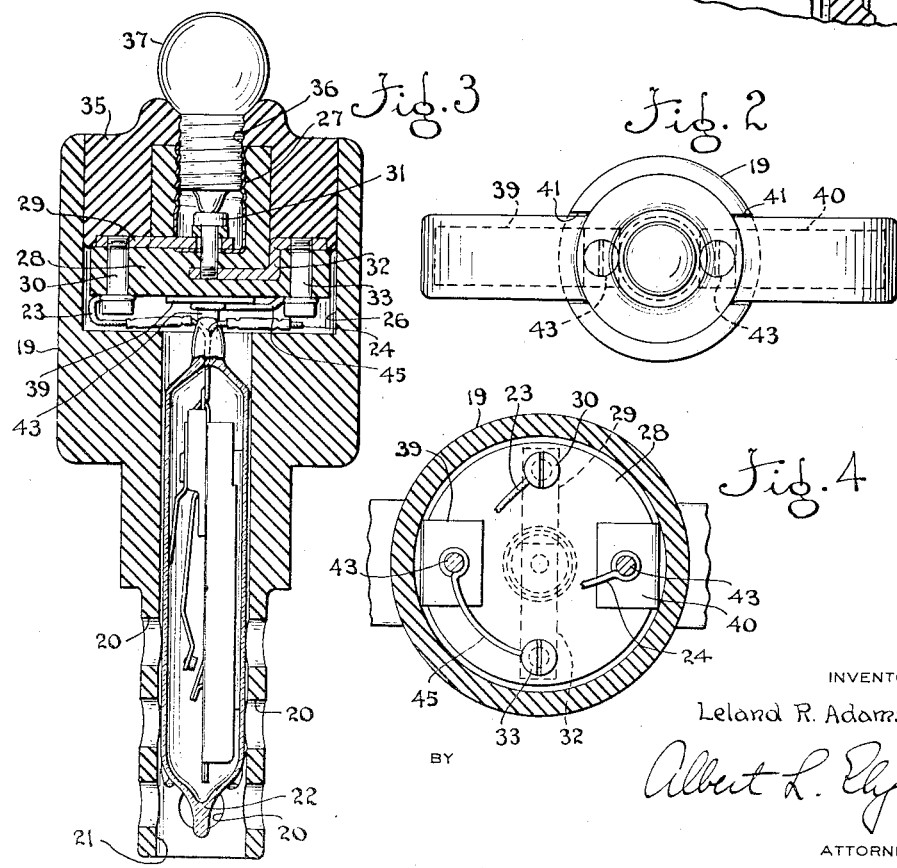
INVENTOR
Leland R. Adams
BY
Albert L. Ely
ATTORNEY Patented Jan. 26, 1937

2,069,054

UNITED STATES PATENT OFFICE 2,069,054

WARNING DEVICE

Leland R. Adams, Silver Lake, Ohio, assignor to The Firestone Steel Products Company, Akron, Ohio, a corporation of Ohio Application October 15, 1935, Serial No. 45,024

2 Claims. (Cl. 136—182)

This invention relates to warning devices, and more especially it relates to warning devices adapted for use with electric storage batteries to give visible and/or audible warning of an overheated condition of said batteries.

The invention is of value for use in such public or private garages that are equipped for charging storage batteries, and in factories where storage batteries are manufactured and charged or discharged.

Briefly stated, the invention consists of a heat-responsive device associated with the electrolyte in the battery, and an electric warning signal associated therewith and operated by the electric current of the battery when the electrolyte in the battery reaches a determinate maximum temperature.

The chief objects of the invention are to prevent injury to and possible spoilage of storage batteries, by the charging or discharging thereof at too high a rate or with restriction of the radiation of heat, which would cause overheating of the electrolyte with consequent warping of the containers and buckling of plates, as well as reducing the life of the battery. A further object is to provide a simple, compact, and self-contained device to give a warning that the temperature of the electrolyte is too high. Other objects will be manifest as the specification proceeds.

Of the accompanying drawing:

Figure 1 is vertical section through a storage battery, and the improved warning device in side elevation, operatively associated therewith, the latter being partly broken away and in section;

Figure 2 is a plan view of the improved warning device;

Figure 3 is a section on the line 3—3 of Figure 1, on a larger scale; and

Figure 4 is a section on the line 4—4 of Figure 1.

Referring to the drawing, 10 is the box or case of a storage battery which usually consists of three cells, 11 is the usual cover of one of the cells, 12, 13 are positive and negative plates in said cell, 14 is a separator between said plates, 15, 16 are positive and negative poles or terminals of the respective plates 12, 13, and 17 is liquid electrolyte in the cell, said electrolyte being at a level which submerges the plates 12, 13 and separators 14. It will be understood that each cell contains a plurality of the separators and plates, and that the plurality of positive and negative plates each have but a single pole 15 or 16. The cover 11 is formed with the usual threaded aperture 11ª to receive a vent plug (not shown), and, when said vent plug is removed, to receive the improved warning device.

The latter comprises a generally cylindrical tubular shell 19 of acid-resisting, dielectric material, preferably molded hard rubber composition. The lower end portion of shell 19 is of reduced diameter so as to pass easily through the aperture 11ª of the battery box cover 11, the upper end portion of the shell being somewhat larger to accommodate electrical connections presently to be described. The reduced lower end portion of the shell 19 is formed with a plurality of apertures 20, 20, that extend into the axial bore, designated 21, of the shell, and mounted in said axial bore is a thermostatic electrical switch or control set 22. The latter comprises a glass capsule of such outside diameter as to fit loosely within bore 21, so that fluid and heat entering into the bore 21 through the open lower end thereof, and through apertures 20, may have access to the said switch over a substantial area of its surface. The switch or control set 22 is a standard product so that no detail description thereof need be given here. The specific control set which has been found satisfactory for the purpose of this invention is set to operate at 41° C. A pair of electrical conductor wires 23, 24 extend from the upper end of the switch 22.

The large upper end portion of shell 19 is formed with a relatively large concentric recess 26 that receives a composite structure comprising a threaded metal socket 27 molded into a base receptacle or block 28 of rigid dielectric material such as fibre or hard rubber. A metal plate 29 having electrical connection with the socket 27 is molded into the block 28, radially thereof, and a terminal screw 30 threaded into plate 29 extends downwardly through the block and has its head disposed on the lower surface thereof. An axial contact screw 31 is molded into block 28 with its head disposed within socket 27 and insulated therefrom, the lower end of said screw being threaded into a plate 32 that is molded into block 28, radially thereof. A terminal screw 33 extends through the block 28 from the bottom thereof and is threaded into plate 32 at the outer end thereof. The outside diameter of block 28 is somewhat smaller than the diameter of recess 26, as shown.

Vulcanized to the upper part of block 28 is a plug-like structure 35 of resilient soft rubber composition, which structure is substantially the same outside diameter as the recess 26 of the shell 19 so that it will fit snugly within said recess. The structure 35 has an axial recess 36 that is a continuation of the recess in socket 27, said recess 36 having a rounded or flared orifice. The arrangement is such that when a lamp bulb such as that shown at 37 is threaded into socket 27, the rubber structure 35 will yieldingly embrace the exposed threaded metal portion of the lamp and make contact with the glass of the bulb, with the result that corrosive fumes, which surround the device while in use, are substantially excluded from the metal parts thereof.

Molded into the soft rubber structure 35 are oppositely extending, spring-metal contact leads 39, 40, the inner end portions of which are angularly bent so as to extend onto the bottom face of block 28. The medial portions of the leads 39, 40 are arcuate and bowed toward each other, and are covered with soft rubber composition that is integral with the structure 35. The shell 19 is slotted at diametrically opposite points 41, 41 to accommodate the said rubber covered leads. The outer end portions of the latter are not insulated, and are thus adapted to make electrical contact with suitable power conducting members, such as the poles 15 and 16 of a storage battery, as shown in Figure 1.

The composite structure described is permanently assembled with the shell 19 by means of screws 43, 43 that are embedded in said composite structure and are threaded into said shell. Assembly is effected by passing the screws through suitable recesses formed in the soft rubber structure 35, which recesses are closed with any suitable material, as shown at 44, 44, Figure 1, after assembly is effected. Before the assembling of the respective elements as described, conductor wire 23 from the control set 22 is secured to terminal screw 30, and conductor wire 24 is secured, as by soldering, to the inner end portion of contact lead 40. A short connector wire 45 is secured at one of its ends to terminal screw 33 and at its opposite end is secured to contact lead 39, as shown in Figure 4. The arrangement is such that the lamp 37 is connected to the control set 22 and the latter is in series with the contact leads 39, 40.

The operation of the device in the charging of a storage battery is as follows. The vent plug of one of the cells of the battery to be charged is removed, and the reduced end portion of the warning device inserted through the vent plug opening 17 until its lower end rests upon the upper margins of the separators 14, below the level of the electrolyte 17. The contact leads are flexed and engaged with the respective poles 15 and 16 of the cell.

The battery is then charged in the usual manner. If the battery is charged or discharged at too high a rate or if radiation of heat is restricted, the temperature of the electrolyte rises, causing the temperature of the electrolyte to exceed 41° C. with the result that the control switch 22 automatically operates to close the electrical circuit through the lamp bulb 37, whereby the latter is lighted by electric current from the battery passing to the lamp through contact leads 39, 40. Thus the lamp 37 constitutes a warning signal indicating that the temperature of the battery electrolyte is too high, and charging and discharging of the battery should be discontinued before damage is done. Obviously an electrically operated audible signal could be substituted for the lamp 37.

The device is simple and self-contained, is operated by the electric current of the storage battery, which operation is controlled by the temperature of the electrolyte in the battery, and accomplishes the other objects set out in the foregoing statement of objects.

Modification may be resorted to without departing from the spirit of the invention or the scope of the appended claims.

What is claimed is:

1. A warning device for use in charging and discharging batteries, said device comprising a structure of non-corrosive, dielectric material having a portion insertable into the electrolyte of a storage battery cell, a thermally operated electrical switch within said last-mentioned portion and exposed to said electrolyte, a pair of resilient contact arms extending from the structure and engageable with the opposite poles of the battery cell, a socket adapted to receive an electrically operated warning signal connected in series with said contact arms through the agency of said switch, and a soft rubber structure about said socket and so constructed as to make sealing engagement with the warning signal so as to exclude corrosive fumes from the metallic portions of the device.

2. A warning device for use in charging and discharging batteries, said device comprising a structure of non-corrosive, dielectric material having a portion insertable into the electrolyte of a storage battery cell, a thermally operated electrical switch within said last-mentioned portion and exposed to said electrolyte, a pair of resilient contact arms extending in opposite directions from the structure and engageable with the opposite poles of the battery cell, a socket adapted to receive an electrically operated warning signal connected in series with said contact arms through the agency of said switch, and a unitary soft rubber structure having a portion disposed about the socket so as to make sealing engagement with the warning signal, and having portions extending onto the respective contact arms to insulate the same and to permit manual flexing thereof.

LELAND R. ADAMS.